No. 733,697. PATENTED JULY 14, 1903.
L. CHRONIK.
BATTERY CONNECTION.
APPLICATION FILED NOV. 15, 1902.
NO MODEL.

Witnesses:
Raphaël Netter
S. S. Dunham.

Louis Chronik, Inventor
by Kerr, Page & Cooper, Atty's

No. 733,697.

Patented July 14, 1903.

UNITED STATES PATENT OFFICE.

LOUIS CHRONIK, OF NEW YORK, N. Y., ASSIGNOR TO UNITED STATES BATTERY COMPANY, OF BROOKLYN, NEW YORK, A CORPORATION OF NEW YORK.

BATTERY CONNECTION.

SPECIFICATION forming part of Letters Patent No. 733,697, dated July 14, 1903.

Application filed November 15, 1902. Serial No. 131,458. (No model.)

*To all whom it may concern:*

Be it known that I, LOUIS CHRONIK, a citizen of the United States, residing at New York, borough of Brooklyn, county of Kings, State of New York, have invented certain new and useful Improvements in Battery Connections, of which the following is a specification, reference being had to the drawings accompanying and forming part of the same.

My invention relates to means for connecting a lead or conductor to a battery element, particularly in secondary or storage batteries in which the part of the element to which the conductor is to be connected is made of lead. A binding-post construction is the most convenient for such purposes; but owing to the softness and pliability of lead such devices when made of that metal speedily wear out. Other and more durable metals when employed for this purpose are attacked by the acid in the battery fluid, thus not only destroying the connecting device itself, but also impairing the efficiency of the battery. I have therefore devised the present invention, by which the non-corrodible properties of lead are combined with the durability of brass or other metal; and it consists of the novel elements and combinations hereinafter described, and more particularly pointed out in the claims, its chief feature being a binding-post construction in which the wear-resisting parts are entirely protected by non-corrodible material.

Figure 1:
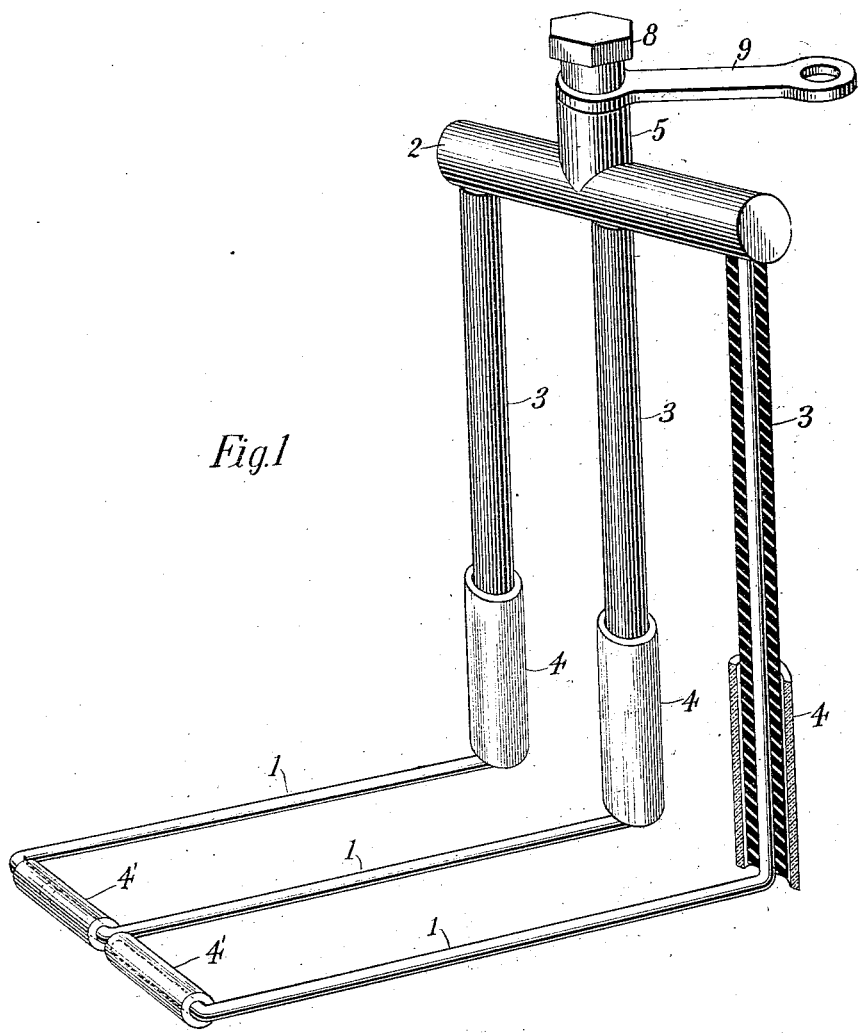
Figure 2:
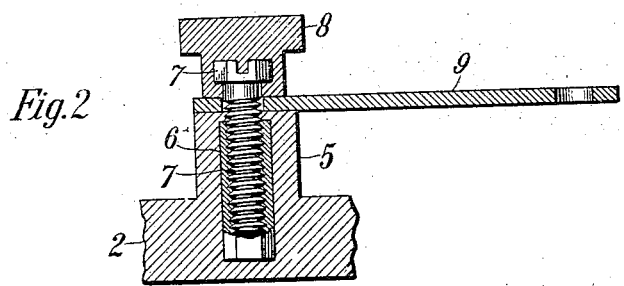

Referring now to the drawings, Figure 1 represents a device for supporting the zinc positive element of a secondary battery. Fig. 2 is a detail of Fig. 1 in section, showing the binding-post.

The embodiment which I have selected as illustrative of my invention consists of a series of heavy wires or rods 1, formed as shown and united at their upper ends to a bar 2, of hard lead—for example, antimonious lead. The horizontal parts of the wires or bars 1 are exposed and are intended to support the zinc plate, which constitutes an element of the battery. The upright portions are covered with suitable insulating material 3 for the well-known purpose. The uprights also carry short sleeves 4, preferably of glass. The negative element, which is arranged horizontally over the other, either rests on the tops of the sleeves or is suspended a short distance above, so that the zinc-supporting device will not be displaced. The angular horizontal parts may also be covered with glass sleeves 4', if desired.

On the lead bar 2 is a neck 5, in which is secured, preferably by casting the lead around it, a socket 6, of brass or other suitable wear-resisting material, screw-threaded on its interior. A corresponding screw 7 is secured in a head 8. 9 represents a lead-strap conductor, usually of soft metal, having an opening through which the screw 7 passes. The head 8 is now screwed down firmly, thus making a very tight joint between the harder lead parts and the strap, insuring good electrical connection and completely protecting the corrodible socket and screw. It will thus be seen that my connection possesses all the advantages of the lead construction together with the strength and durability of brass.

The form described is of course merely typical of my invention, which is capable of numerous variations. For example, the socket may be embedded in the head instead of in the neck or bar and the screw in the latter. I also do not consider my invention limited to use in a battery, since there are other places in which its advantages are equally desirable.

Having now fully described my invention, what I claim is—

1. In an electrical connection, a binding-post construction comprising a wear-resisting screw and socket embedded in conducting, corrosion-resisting metal, whereby the screw and socket are protected from corrosion, as and for the purposes set forth.

2. In an electrical connection, the combination with soft-metal conducting parts, of a hard-metal screw-threaded socket embedded in one of said parts, and a hard-metal screw secured in the other of said parts, whereby when a conductor is held between said parts the screw and socket will be unexposed, as and for the purposes set forth.

3. In an electrical connection, the combination with a soft-metal neck and a hard-metal screw-threaded socket embedded therein, of a soft-metal head bearing a hard-metal screw adapted to enter said socket, as and for the purposes set forth.

LOUIS CHRONIK.

Witnesses:
M. LAWSON DYER,
S. S. DUNHAM.